(12) United States Patent
Vasquez et al.

(10) Patent No.: US 8,340,252 B2
(45) Date of Patent: Dec. 25, 2012

(54) SURVEILLANCE DEVICE DETECTION WITH COUNTERMEASURES

(75) Inventors: Hector Vasquez, Traverse City, MI (US); Martin Kuttner, Holly Springs, NC (US)

(73) Assignee: Early Rescue Solutions, LLC, Traverse City, MI (US)

( * ) Notice: Subject to any disclaimer, the term of this patent is extended or adjusted under 35 U.S.C. 154(b) by 630 days.

(21) Appl. No.: 12/493,522

(22) Filed: Jun. 29, 2009

(65) Prior Publication Data

US 2010/0008477 A1    Jan. 14, 2010

Related U.S. Application Data

(60) Provisional application No. 61/133,327, filed on Jun. 27, 2008.

(51) Int. Cl.
*H04M 1/24*   (2006.01)
*H04M 3/08*   (2006.01)
*H04M 3/22*   (2006.01)

(52) U.S. Cl. ............................. 379/7; 379/161; 379/184

(58) Field of Classification Search ........... 379/7, 15.05, 379/22.03, 24, 26.02, 27.02, 27.03, 27.06, 379/161, 168, 184
See application file for complete search history.

(56) References Cited

U.S. PATENT DOCUMENTS

| 5,157,708 | A | * | 10/1992 | Garthwaite et al. | 379/21 |
|---|---|---|---|---|---|
| 5,652,575 | A | * | 7/1997 | Pryor et al. | 379/29.11 |
| 5,742,665 | A | * | 4/1998 | Chao | 379/7 |
| 5,881,129 | A | * | 3/1999 | Chen et al. | 379/26.02 |
| 5,889,836 | A | * | 3/1999 | Nataf | 379/7 |
| 6,002,747 | A | * | 12/1999 | Eftechiou | 379/35 |
| 2007/0001685 | A1 | * | 1/2007 | Gorka | 324/522 |
| 2007/0071229 | A1 | * | 3/2007 | Kozek et al. | 379/399.01 |

* cited by examiner

*Primary Examiner* — Quoc D Tran
(74) *Attorney, Agent, or Firm* — Mitchell M. Musial II, PLLC; Mitchell M. Musial, II

(57) ABSTRACT

Disclosed herein is a method and apparatus for detecting surveillance devices on a telephone line and deployment of countermeasures therefor. The apparatus comprises a line monitoring circuit for evaluating whether the phone is off hook or ringing. A test generation circuit produces a test signal to be injected into a line and issues test commands. A signal response analysis circuit compares a test signal response to a baseline signal response and reports an anomaly when the difference between a test signal response and a baseline signal response exceeds a threshold. Additionally, an anomaly may be reported when an unusual signal is detected, such as a clock. A detection management circuit issues countermeasures to the anomaly based on programmed responses.

2 Claims, 6 Drawing Sheets

SURVEILLANCE DEVICE DETECTION WITH COUNTERMEASURES

CROSS-REFERENCE TO RELATED APPLICATION

This application claims the benefit of U.S. Provisional Application 61/133,327, which was filed on Jun. 27, 2008, the entire disclosure of which is hereby incorporated by reference.

FIELD OF THE INVENTION

The present invention relates to a method and apparatus for detecting surveillance devices on a telephone line and deployment of countermeasures therefor. More specifically, the invention relates to an automated device for continuous supervision of a telecommunications line without interfering with a line access.

BACKGROUND OF THE INVENTION

There are multiple solutions in the art for the detection of anomalies, including bugging devices.

For example, a digital multi-meter (DMM) may be used to measure the voltage on a phone line, the current when the phone is on and off the hook, and the resistance of the telephone. The telephone is referred to herein as a customer purchased equipment (CPE). The DMM can perform some very basic functional tests to measure the electrical characteristics of equipment, such as how much power the device is using and if there is another device drawing power from a phone line. If the bugging device is primitive enough to draw too much current and load the phone line down, then the DMM can detect it and compare the current draw to a known good phone, thereby allowing the DMM to flag the anomaly.

The DMM can also be used with an Audio Generator Set to trigger primitive bugs into going into their active mode. In some cases the bug will immediately start sending signals down the line which can be picked up by the DMM. An Audio Spectrum Analyzer is adapted to the low end of the frequency range, encompassing audio to ultrasonic frequencies (20 Hz-5 MHz) which may be transmitted down phone and power lines.

A Time Domain Reflectometer (TDR) is a device that can determine if there are any deviations in electrical characteristics of a cable and can report the location of the disturbance in the cable. The graph of the response can be quite complex to interpret for a human user. The TDR signal is often blocked by electrical devices, such as a phone, thus rendering it ineffective in locating bugs past certain types of devices. In some cases, bugs can use this to their advantage to "mask" themselves. TDR measurements are also sensitive to cable attenuation. That is, the farther the fault is from the TDR, the lower the response signal that comes back to the device, and large impedance mismatches or diminish the available return signal. Thus, the technician has to sequentially fix the faults in order to look further down the line. In order to perform TDR measurements, the line also has to be taken out of service.

An RF Field Strength Detector (FSD) is used to determine if there are electrically active devices (bugs) clipped to or installed in "innocent" devices or cables. The RF FSD will only catch "noisy" bugs, such as continuously transmitting devices, or devices that have microprocessors continuously running and are not sufficiently shielded. The quieter the bugging device, the closer the RF FSD has to be to it to register a signal.

An RF Spectrum Analyzer (SA) is a much more sophisticated version of the RF. An RF SA is used to sweep through the RF frequency band to locate any potentially radiating devices, such as bugs. The biggest problem with this method is that the RF spectrum is very active, therefore locating the source becomes difficult. Even with a sophisticated signal analysis package, if the bug only transmits in a timed burst mode using spread spectrum techniques (say once a day at any given time), the likelihood of detecting it in an unshielded room using the RF SA is virtually impossible.

Of the four technologies, the TDR, the RF FSD, and the RF SA can determine the approximate location of an anomaly, though none can definitely identify its nature. In the case of the RF FSD and RF SA, the bugging device has to be noisy enough and on long enough for it to be picked up. In the case of the TDR, multiple reflections can often cause a very complicated pattern that is difficult to interpret. The TDR also has an attenuation problem due to the relatively small amount of energy that is available in the step pulse to detect line impedance anomalies.

In use, the RF SA has to be coupled with a sophisticated data extraction and analysis package since the RF bug could be transmitting just about anywhere in the RF spectrum. Newer technologies have made it much more difficult to detect such devices, as they can illegally use mobile phone frequencies, ISM bands, and spread spectrum techniques with data squirts to hide themselves from a simple RF sweep. Often a long duration test coupled with multiple antenna locations to perform relative signal strength measurements to subtract background noise is required, and even then the bug may escape detection.

Tone generator/receiver devices work by generating a series of signals that are sent down the wire and an integrated receiver picks up the returned power from the other line. Most of the devices have a series of discrete or other "proprietary" tones, and are designed to stimulate either the TIP or RING lead only while detecting the signal that is coupled into the other line. These signal levels are then put through a mathematical algorithm that generates a number which corresponds to the overall response of the line to the series of tones.

Generally the tone receivers work over a fixed, discrete set of waveforms, and use a simple RMS style power envelope detector for recovering the received signal. The detector function is relatively broadband, so that even though there is only one tone being sent out, the detector will pick up any other additional noise on the line. These are handheld devices with no memory or database connectivity that are designed for intermittent manual use, as they also require the phone line to be disconnected during testing.

Thus, it is desirable to provide a method and apparatus for detecting surveillance devices on a telephone line that employs continuous monitoring. Additionally, it is also desirable to provide a method and apparatus for detecting surveillance devices that does not require an operator. Finally, it is also desirous to provide a method and apparatus for detecting surveillance devices that may be employed without disrupting use of the telephone line.

SUMMARY OF THE INVENTION

An apparatus for detection of a surveillance device on a telephone line has countermeasures for disrupting a detected surveillance device. An apparatus for detecting a surveillance device on a telephone line and for issuing countermeasures for disrupting a detected surveillance device, comprising: a line monitoring circuit for detecting a state of a line, the line monitoring circuit reporting an IN-USE state if an off-hook state is detected on a line or if a ring state is detected on a line, or a NOT-IN-USE state if neither an off-hook state is detected or a ring state is detected; a test generation circuit having a controller for receiving the state of the line from the line monitoring circuit and producing a test signal to be injected into the line and issuing a test command; a test switch circuit for receiving the test command from the controller, injecting the test signal into the line, and receiving a test signal response; a signal conditioning circuit for receiving the test signal response from the test switch circuit and measuring the test signal response; and wherein the controller compares the test signal response measurement with a baseline signal response measurement, and issues a countermeasure command when the difference between the test signal response measurement and the baseline signal response measurement exceeds a threshold.

A detection management circuit can issue countermeasures. A line interface circuit is provided to break a connection on the line when the countermeasure command from the controller comprises a test command directing the line interface circuit to break the connection on the line. The detection management circuit may also render a countermeasure that transmits a message to a user that a line is compromised. Alternatively, a detection management circuit renders a countermeasure that issues a connection termination command to the line interface circuit.

In one embodiment, the test switch circuit can test a single line. Alternatively, the test switch circuit can test a line pair. The test switch circuit can also test two lines that are not a line pair. The test switch circuit can also test all lines in the apparatus input and output ports.

The test commands determine the line to be broken to test the CO side of the line or the CPE side of the line, or whether the line remains connected and to test both the CPE side and the CO side of the line regardless of line state.

An apparatus for detection of surveillance devices on a telephone line having countermeasures for disrupting a detected surveillance device comprises a case having at least one line input, at least one line output, and a communications output. A programmable controller is disposed within the case and has a central processing unit and memory storage. The memory storage is adapted to receive instructions, such as firmware.

The controller executes instructions to (a) transmit a test signal to at least one user-selectable line; (b) compare a test signal response measured from at least one user-selectable line to a baseline response; (c) report a change in line state when the difference between a test signal response and a baseline signal response exceeds a threshold; and (d) issue a countermeasure request based upon countermeasure settings. Countermeasures are selected from the group consisting of alerting a user that a line is compromised via text message, alerting a user that a line is compromised via email message, alerting a user that a line is compromised via wireless display device, and a line termination.

A switch matrix is provided for injecting a test signal, breaking a line connection if commanded by a test signal, extracting a response signal and terminating a connection if commanded by a countermeasure request.

A method for detecting a surveillance device on a telephone line and administering countermeasures for disrupting a detected surveillance device comprises monitoring a line to evaluating a line state; reporting an IN-USE state when an off-hook state is detected or a ring state is detected; reporting a NOT-IN-USE state when neither an off-hook state nor a ring state are detected; producing a test signal to be injected into a line and issuing test commands for directing a test signal to a line to be tested; comparing a test signal response to a baseline signal response, the baseline signal response extracted by the switch matrix to indicate the presence of a surveillance device when the difference between a test signal response and the baseline signal response exceeds a threshold and breaking a line connection upon received test commands.

In another aspect, the present invention provides a method for detecting a surveillance device on a telephone line and administering a countermeasure for disrupting a detected surveillance device comprising: monitoring the telephone line to determine a line state; producing a test signal to be injected into a line; issuing a test command for directing the test signal to the line; receiving a test signal response; comparing the test signal response with a baseline signal response; and issuing a countermeasure when the difference between the test signal response and the baseline signal response exceeds a threshold.

Further objects, features, and advantages of the present invention will become apparent to those skilled in the art from analysis of the following written description, the accompanying drawings, and the appended claims.

DESCRIPTION OF THE PREFERRED EMBODIMENT

Figure 1:
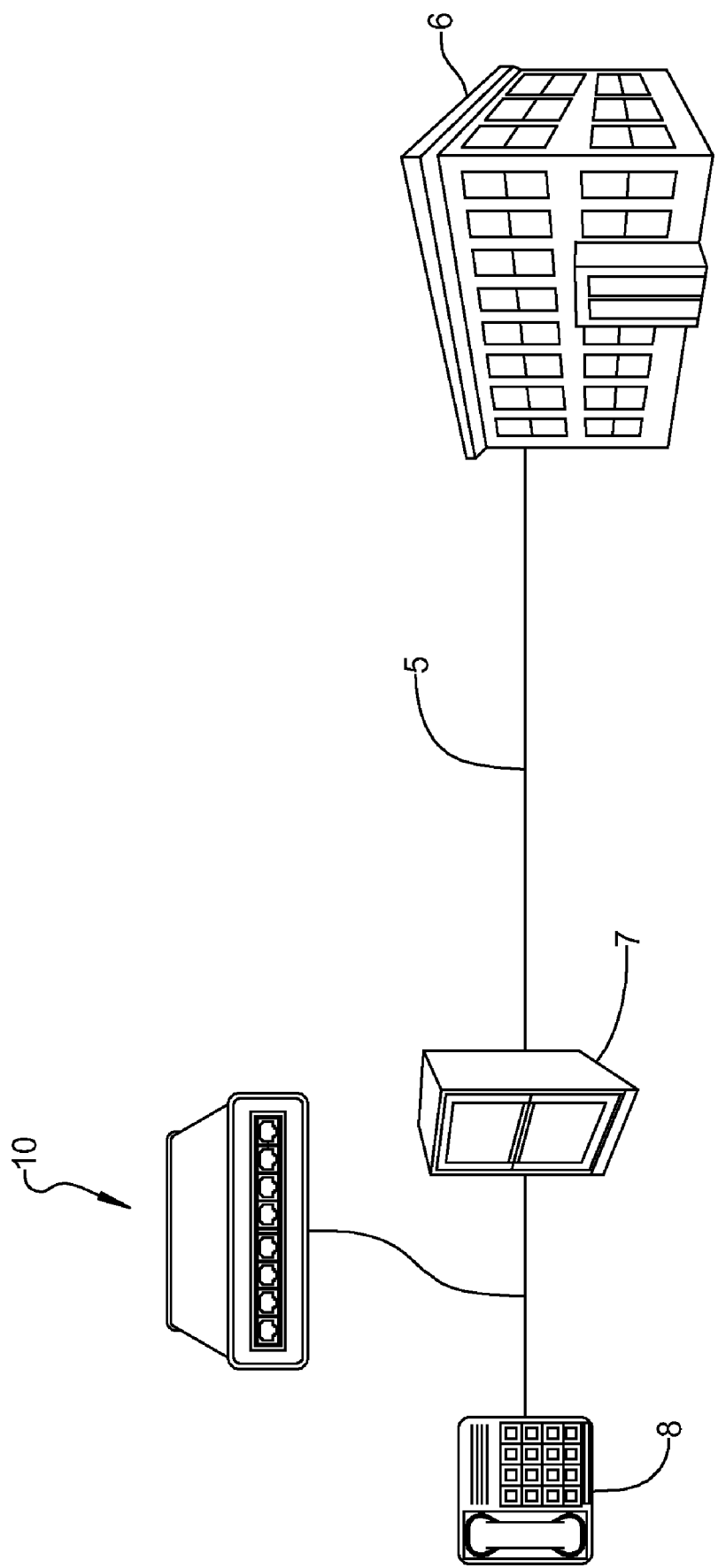
FIG. 1 is a schematic illustration showing the apparatus of the present invention connected to a telephone line according to one embodiment of the present invention.

Referring now to FIG. 1, a schematic illustration showing a remotely accessible telecommunications monitoring apparatus 10 is connected to a telephone line 5. In the preferred embodiment, the apparatus 10 is located in a private branch exchange 7 (PBX), or closet. The line 5 carries signals from the central office 6 (CO) to the PBX 7. Signals from the PBX 7 are routed to a customer purchased equipment 8 (CPE), such as a phone. The apparatus 10 can also be connected to the telephone line 5 between the CO 6 and the PBX 7, in the CO 6 itself, or in any other suitable location in which the telephone line 5 can be routed through the apparatus 10 in accordance with the description of the apparatus 10 below.

Figure 2A:
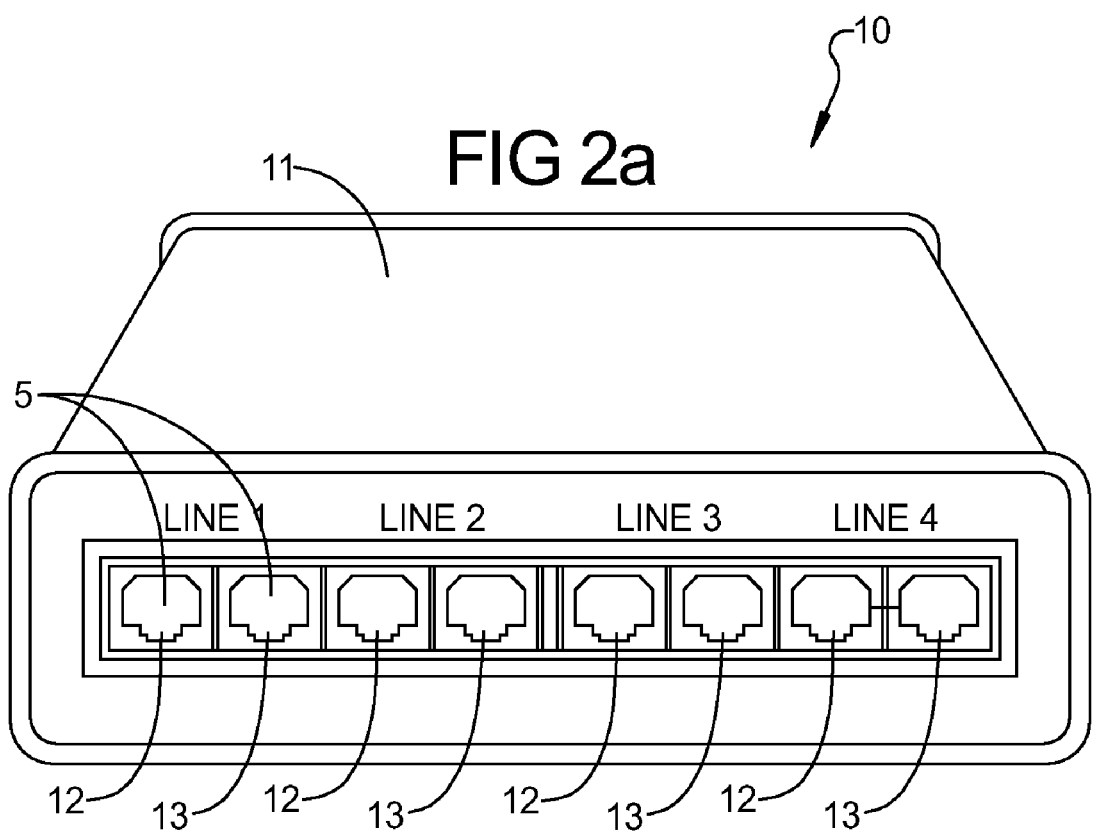
FIG. 2a is perspective view of one embodiment of the apparatus of the present invention revealing a plurality of line inputs and line outputs on the front side of the apparatus.

Referring now also to FIG. 2a, a perspective view of the exemplary embodiment of a 4-line monitoring apparatus 10 according to the principles of the present invention is shown. Apparatus 10 comprises a case 11 containing a controller (not shown), a non-volatile memory (not shown) and a CPU (not shown). In the front of the apparatus 10 are a plurality of input ports 12 and output ports 13, which in the present embodiment are RJ ports (eg., a phone jack or an Ethernet port) having a plurality of line-paired ports. In operation, the input ports 12 and output ports 13 are connected internally by a circuit, described in more detail below. As such, each line 5 is interconnected to the apparatus 10 through an input port 12 and output port 13.

Figure 2B:
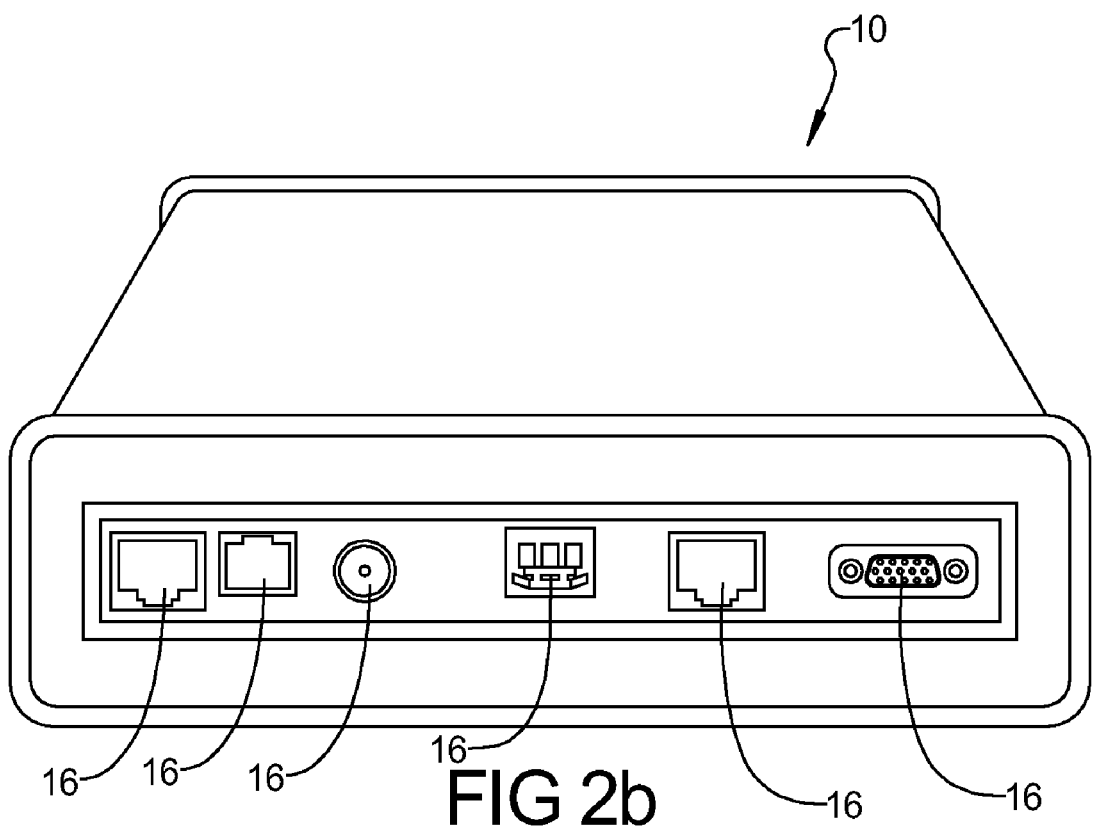
FIG. 2b is perspective view of one embodiment of the apparatus of the present invention revealing a plurality of communication device outputs on the back side of the apparatus.

Referring now also to FIG. 2*b*, the back side of the apparatus 10 reveals a plurality of communication device outputs 16, including USB, Serial, 10/100 Ethernet, RJ ports, and wireless communication such as GSM. Although other communications protocols are available, however not listed, any reasonable communications means may be employed for communication with the apparatus 10.

Although the phone line shown is in the form of POTS technology (Post Office Telephone Service, or Plain Old Telephone Service), ISDN or VoIP may be monitored as well. The terminology used in telecommunications technology may be better understood with reference to a phone jack, or TRS jack, as used in the prior art when switchboard operators would plug the lines manually into a board of a manual telephone exchange. Each jack includes three conductive components: the tip, the ring, and the sleeve. A first insulator is disposed between the ring and the tip, and a second insulator is disposed between the ring and the sleeve. Although RJ ports receive lines having a plurality of wires, for purposes of the present invention, only the tip and ring of the paired lines are of concern. Other paired lines may be used for the data paired lines or spare wires.

Some CPE station ports are 24V/DC, rather than the normal 48-50V/DC of a CO line.

The tip is at 0 volts and the ring is at −48 volts. When a phone goes off-hook, current passes through the tip and ring pair and voltage drops by about 10 to 5 volts. At this point the phone company listens for a tone, as do other parties. When there is an incoming call, the CO 6 will send a 52-125 volt AC sine or square wave up the line 5 causing the CPE 8 to ring. In general, the CO 6 sends around 90 VAC at 20 cycles per second, with a true sine wave.

The apparatus 10 of the present invention tests for an anomaly in the line 5. As defined herein, an anomaly is any measured discontinuity in a telecommunications line. In the present embodiment, the discontinuity that is measured is high impedance. The unit 10 can conduct one of three types of tests. The first test type, Type 1, evaluates the line 5 leading from the CO 6 to the apparatus 10. The second test type, Type 2, evaluates the line 5 leading from the CPE 8 to the apparatus 10. The third test type, Type 3, evaluates the line 5 leading from the CPE 8 to the CO 6. Since Type 1 and Type 2, test from the apparatus 10 to either the CO 6 or CPE 8, these test types advantageously can identify the direction of the anomaly. However these test types interfere with a phone conversation. Conversely, Type 3 permits the user to continue to use the line while the test is in process, however, only the presence of the anomaly is known, not the direction of its location.

Figure 3:
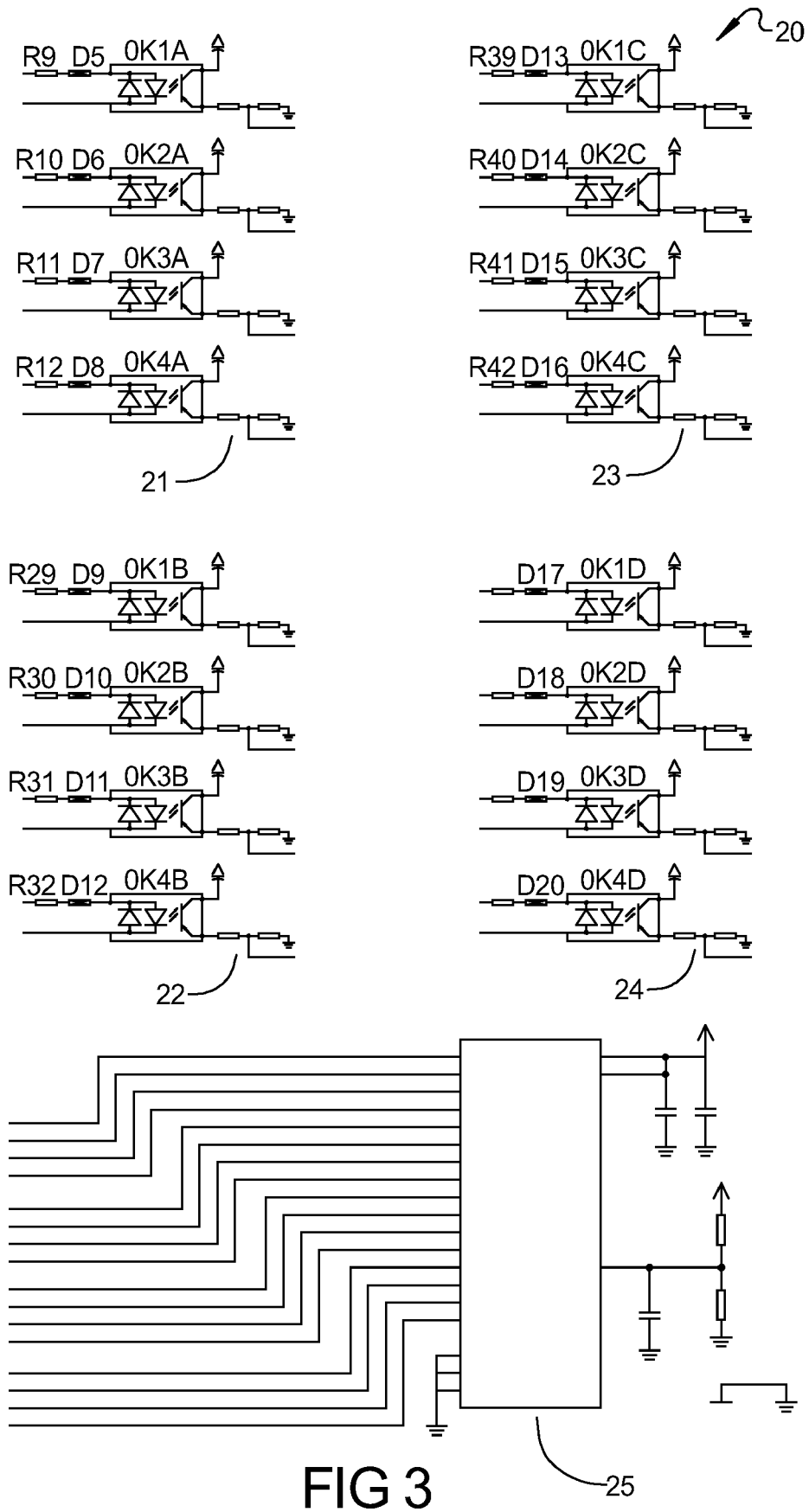
FIG. 3 is a line monitoring circuit for determining whether the line is in use according to the principles of the present invention.

Referring now to FIG. 3, a line monitoring circuit 20 is shown. The line monitoring circuit 20 includes a plurality of arrays 21, 22, 23, 24 for testing a line condition for each of the four lines interconnected to the apparatus 10. Each of the arrays 21-24 are electrically isolated from the lines 5, and each of the arrays 21-24 are preferably optoisolator array.

In the preferred embodiment, each of the optoisolator arrays 21-24 is adapted to detect a respective one of the following conditions: on hook—array 23; off hook array—21; ringing—array 22; and polarity reversed—array 24. The polarity test performed by array 24 is conducted to determine whether the tip and ring wires are reversed. For example, in array 21, the optoisolators OK1A, OK2A, OK3A, OK4A are designed to turn on when the line voltage exceeds the break-over voltage of the zener diodes D5-D8, respectively. Resistors R9-R12 limit the current, although they do not necessarily ensure protection to prevent false off-hook indications to the CO 6. Current through the resistor pairs R9-R12 provides the respective optoisolator OK1A-OK4A with a voltage. The signals leaving the arrays 21-24 are provided to an analog-to-digital converter "A/D" 25 where they are converted to a digital signal. Each array 21-24 determines whether the line 5 is in use through the four tests: on-hook, off-hook, ring, or polarity reversed. The status of the line 5 is evaluated in order to conduct testing of a line without disruption to the user.

This feature, referred to as the Answer Supervision Module, will monitor the telecommunication line 5 to determine whether the line 5 is in use. The test results are evaluated to determine a line state. The line monitoring circuit 20 will report an IN-USE state if an off-hook state is detected, or a ring state is detected. The line monitoring circuit 20 will report a NOT-IN-USE and/or reverse polarity state if neither an off-hook state nor a ring state is detected. The reversed polarity state may be used to detect a false positive of a constant off-hook condition.

Once the line state is known, the apparatus 10 can be commanded to execute one of the three test types. By using the Answer Supervision Module, the apparatus 10 can detect if a call is coming in and immediately abort a test in progress. Alternatively, if a test is scheduled, the test can be suspended until the line is available if the test type would interfere with a conversation. Furthermore, a test type can then be executed that does not interfere with the conversation and does not require the phone to be in a NOT-IN-USE state to execute the test.

Figure 4:
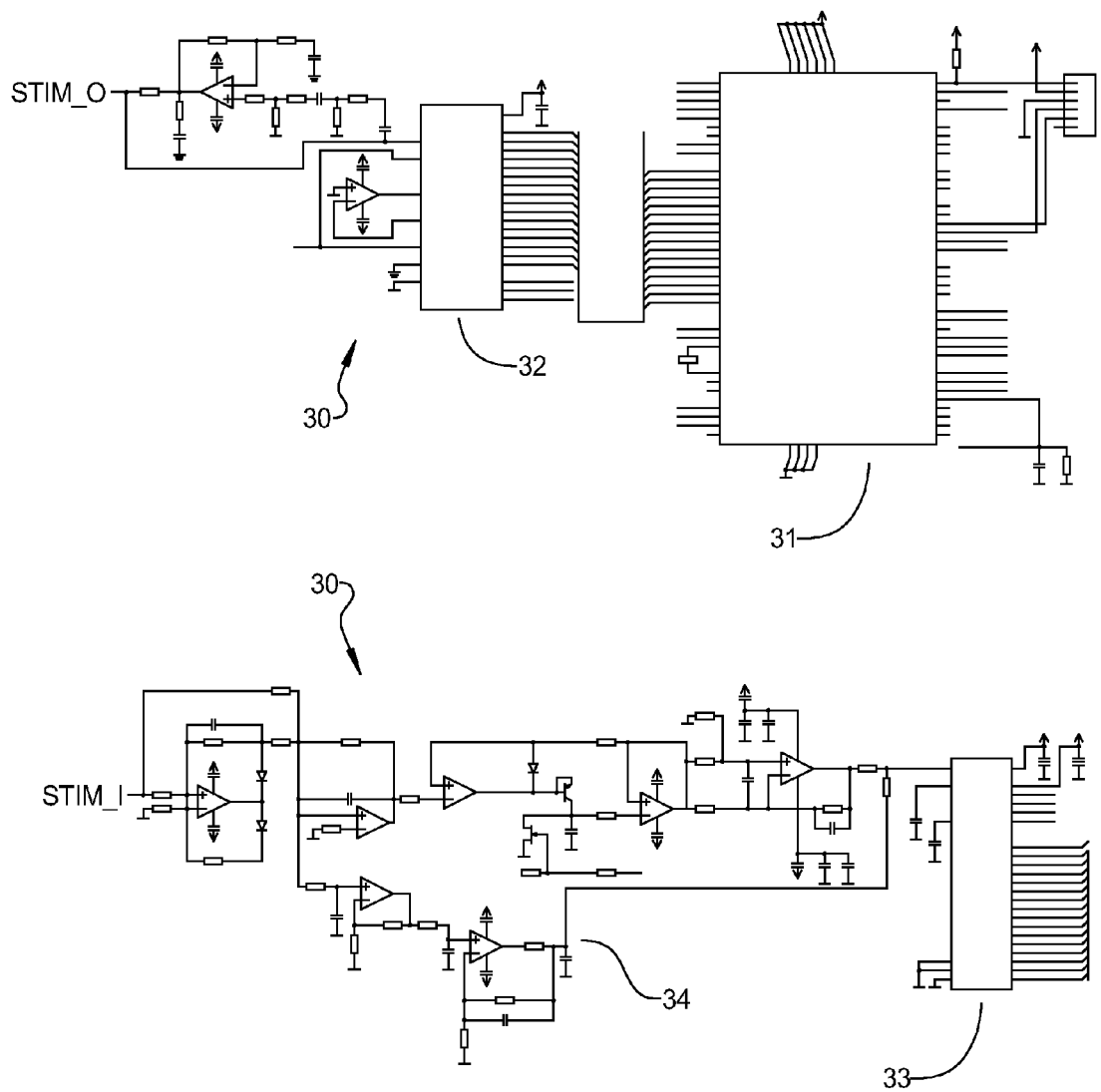
FIG. 4 is a test generation circuit producing a test signal to be injected into a line and issuing test commands according to the principles of the present invention.

Referring now to FIG. 4, a test generation circuit 30 having a controller 31 is shown. The controller 31 has a CPU (not shown) and memory storage (not shown) adapted to receive signals and transmit instructions. The controller 31 receives the digital signal indicative of line state for each line from the A/D 25, and, based on the state of each line, produces instructions to further evaluate the line, as discussed further below. The controller 31 produces a digital signal to command a digital to analog converter "DAC" 32 to produce an analog signal, identified as STIM_O, to be injected into the line 5.

In the preferred embodiment, the instructions executed by the controller 31 include instructions to: transmit a test signal to at least one user selectable line, compare a test signal response measured from at least one user selectable line to a baseline response, report a change in line state when the difference between a test signal response and a baseline signal response exceeds a threshold, and issue a countermeasure based upon countermeasure settings.

In the preferred embodiment, a power amplifier (not shown) provides additional drive capability to the test signal as generated by the test generation circuit 30. The controller 31 is capable of commanding any desired wave form, including a square wave, sinusoidal, triangular, or the like. The controller 31 is programmable to output a user specified test signal, however, it is the intent of the present invention to provide a test signal having a frequency above 50 KHz to enable the apparatus 10 to operate above the range of telephone signals. In the preferred embodiment, the test signal, STIM_O, is a single frequency sine wave having a frequency above 50 KHz.

As used herein, "transmission" should be understood to mean the response monitored on a line other than the line through which the test signal was transmitted. In contrast, "reflection" is understood to mean the response monitored on the same line through which the test signal was transmitted.

The test generation circuit 30 forms part of a stimulus response module which is user-configured. A user may select a test with an option to select a test compatible with an IN-USE state (Type 3) since a Type 1 or Type 2 test would not generally be available. However, the system may be configured to break a call under certain conditions, as set forth in more detail below.

The user may also select which lines are to be tested including pairs or non-pairs. An example of a test pair would be testing the tip and ring wires of Line 1 of the 4-line apparatus 10. A non-pair test can be, for example, testing the tip from Line 1 and ring of Line 3. STIM_O is then injected into the tip of Line 1, and the transmission is monitored on the ring of Line 3. Alternatively, the tip of Line 3 can be monitored. If a reflection test is desired, the tip of Line 1 can be monitored for a response.

Controller 31 is programmed to issue test commands to carry out desired tests. For example, a Type 1 test on a non-pair of lines, such as the tip of Line 1 and the ring of Line 3. In the preferred embodiment, STIM_O is a sine wave having a frequency above 50 KHz. The commands will include a direction to disconnect Lines 1 and 3 to test the tip on Line 1 to the CO 6 and monitor the transmission on the ring of Line 3 if the answer supervision module determines the lines are not in use via the line monitoring circuit 20. If the line monitoring circuit 20 delivers a NOT-IN-USE state for both Lines 1 and 3, the controller 31 will issue the test command.

Figure 5:
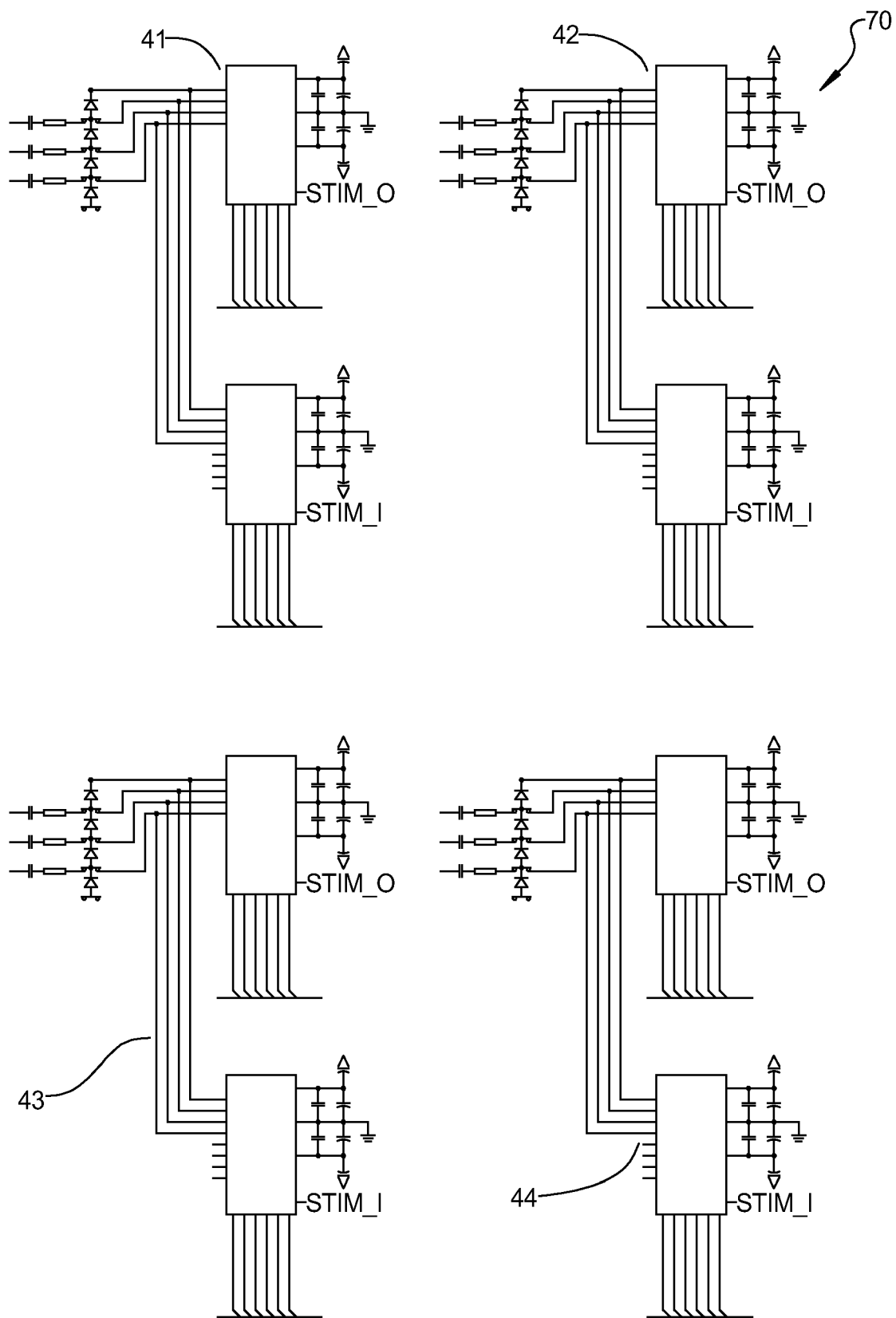
FIG. 5 is a test switch circuit for directing a test and a response signal to a desired line according to the principles of the present invention.

As shown in FIG. 5, the test command is transmitted to a test switch circuit 40, having a plurality of switches 41, 42, 43, 44, collectively referred to as a switch matrix, for sending and receiving test signals. The test switch circuit 40 directs a test signal input and output to a desired line based on the test commands received. A control bus and integrated circuit control the switches 41-44. Each of the switches directs a test signal to and from the designated line based on the test commands. Switch 41 directs all signals for the tip wires leading to the CO 6 side (input side) of the line 5. Switch 42 directs all signals for the tip wires leading to the CPE 8 side (output side) of the line 5. Switch 43 directs all signals for the ring wires leading to the CO 6 side (input side) of the line 5. Finally, switch 44 directs all signals for the ring wires leading to the CPE 8 side (output side) of the line 5. The STIM_O signal is directed out by switches 41-44. Once STIM_O is injected into a line, the response signal STIM_I is monitored on the designated line and wire (tip or ring) by selection of one of the lines on one of the switches 41-44. Accordingly, switches 41-44 direct the STIM_O signal out by, and select the line and wire to monitor, for either the reflection or transmission.

For example, a Type 1 test on a non-pair (eg. using the tip of Line 1 and the ring of Line 3) will direct the STIM_O signal out on Line 1 as switch 41 governs all input ports 12 for the tip. Switch 43 directs the response of the test signal found on the ring of Line 3 and identifies the signal as STIM_I.

Figure 6:
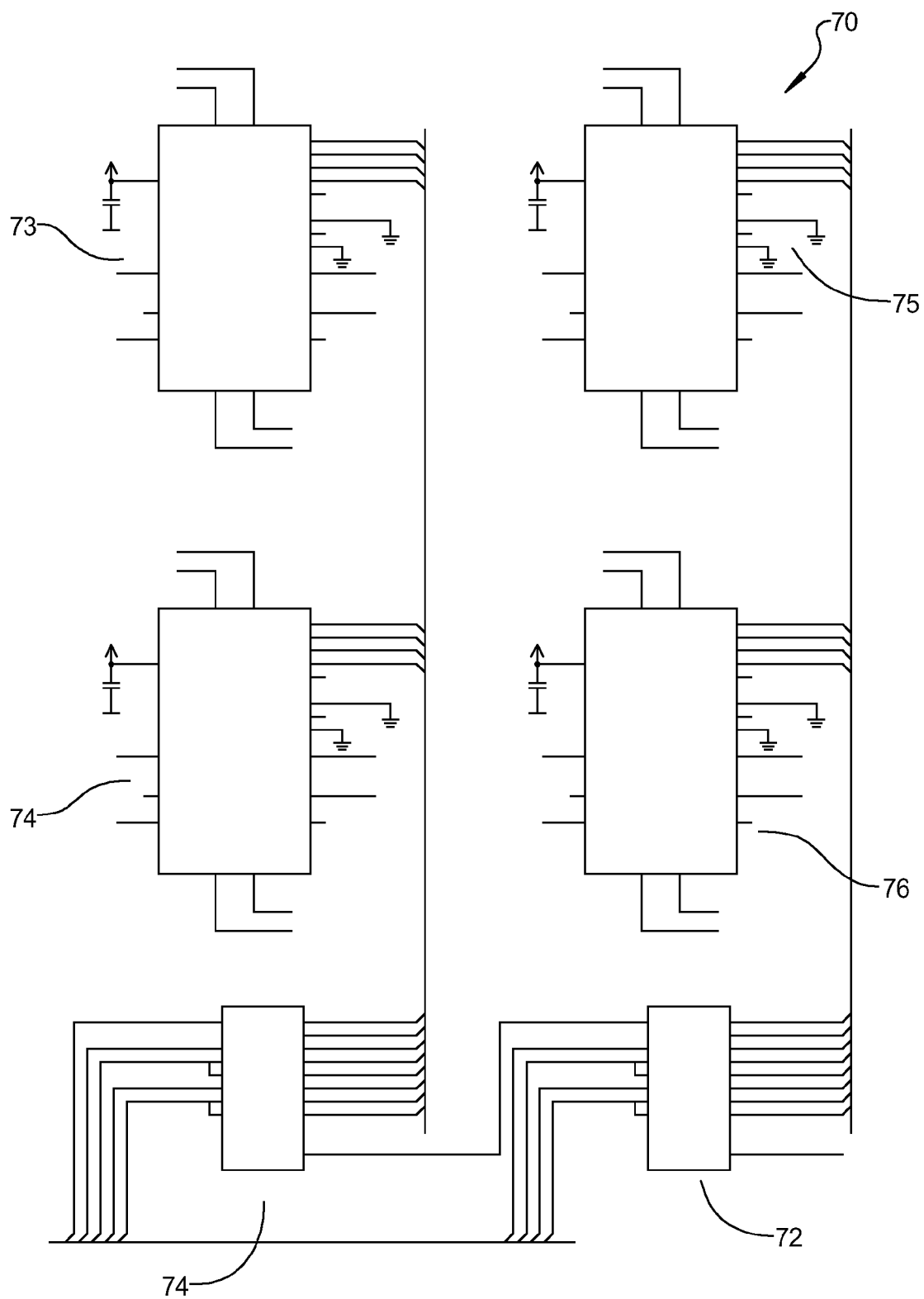
FIG. 6 is a line interface circuit for breaking a line connection according to the principles of the present invention.

Referring now also to FIG. 6, a line interface circuit 70 for breaking a Line connection is shown. Latch chips 71 and 72 control the configuration of line interface chips 73-76. The signals through the switches 41-44 from FIG. 5 are routed through port pins on chips 73-76. This combination allows any permutation of line, tip and ring selection.

In order to carry out a Type 1 or Type 2 test, the line or lines need to be opened. For a Type 1 test on a non-pair (eg. the tip of Line 1 and the ring of Line 3), Lines 1 and 3 will be broken and a test signal will be sent down the tip of Line 1 and the response measured on the ring of Line 3 on the CO 6 side of the apparatus 10. If an anomaly is detected on the CO 6 side of the line 5, the direction of the anomaly may be detected. By breaking a line and testing for an anomaly, the direction of the anomaly will be known. In the present embodiment, a high impedance device is the target of the test. The apparatus 10 will transmit a test signal, identified as STIM_O, down at least one tip or ring line and monitor a response on a predetermined tip or ring line; the response will be identified at STIM_I.

In the present embodiment, the test generation circuit 30 of FIG. 4 also performs the function of a signal response analysis circuit. STIM_I is directed to a signal conditioning circuit 34 comprising a plurality of operational amplifiers and resistors and capacitors. The conditioning circuit 34 can be built in a number of ways, and having objectives which include obtaining a peak leading value and identification of any high frequency signals, such as clock noise on the line. Clock noise is indicative of a digital listening device on the line. Additionally, incoming voltage is measured. In the present embodiment, an RMS detector is used to provide a voltage measurement of the response signal STIM_I. The output of that measurement is stored in a memory storage (not shown) of apparatus 10. A baseline measurement using STIM_O can be made when the telephone system is installed and stored for future comparison with a subsequent test. The test generation circuit 30 includes an analog-to-digital converter "A/D" 33, the output of which is coupled to a bus line where the processor 31 can compare the test signal response to a baseline signal response retrieved from memory. In the preferred embodiment, the result of the test is a unitless number. The value may be affected by variables such as signal, signal conditioning circuitry, and line characteristics, (e.g. inductance on the line).

Alternatively, a test and a baseline measurement may be taken directly on the line without STIM_I injected in the line. As with a test where input signal STIM_I is present, past and current test results may be compared to evaluate a change in the line.

Although an RMS detector is disclosed in the preferred embodiment, other methods may be employed for detecting anomalies, including a vector network analyzer, a Fourier transform, Time Domain Reflectometer, and RF spectrum analyzer. Additionally, other characteristics such as response time of a signal response may be measured which may indicate the presence of a line inductor, thereby requiring a larger sample size on a time basis to make an accurate comparison.

The test data acquired by the apparatus 10 of the present invention provides a "spectral fingerprint" of the line 5 at the time of analysis. A detection management circuit, which in the present embodiment is the controller 31, reports an anomaly on the line 5 when the difference between a test signal response and a baseline signal response exceeds a threshold. The threshold may be a percent change or some other value set by the user or calculated internally. Additionally, an anomaly may be reported when an unusual signal is detected, such as clock noise. An anomaly may include a line fault in which case no countermeasure is appropriate, but merely reporting the line condition would be sufficient.

The detection management circuit can render a decision that a line is compromised. Additionally, the detection management circuit may issue countermeasures. Countermeasures are selected from the group consisting of: alerting a user that a line is compromised via text message; alerting a user that a line is compromised via email message; alerting a user that a line is compromised via wireless display device; and issuing a command to terminate a connection with a line. Additionally, any protocol known in the art for communicating a message may be employed including, but not limited to USB, Serial, 10/100 Ethernet, POTS phone modems, and wireless communication such as GSM. The anomaly may also be reported to a remote location for processing and further reporting.

As shown in FIG. 6, a line interface circuit 70 can be commanded to break a line connection upon a termination command from the detection management circuit, i.e. the controller 31. Alternatively, a user may receive a message to discreetly end the phone conversation so that the listening party does not know they have been discovered.

The foregoing discussion discloses and describes the preferred structure and control system for the present invention. However, one skilled in the art will readily recognize from such discussion, and from the accompanying drawings and claims, that various changes, modifications and variations can be made therein without departing from the true spirit and fair scope of the invention s defined in the following claims.

What is claimed is:

1. An apparatus for detecting surveillance devices on a telephone line comprising:
   a case having at least one line input, at least one line output, a communications output, and a controller;
   the controller having a central processing unit and a memory storage and configured to:
   (a) instruct a test signal to be transmitted to at least one user-selectable line;
   (b) compare a test signal response from one of the user-selectable lines with a baseline signal response;
   (c) report a change in the line state of one of the user-selectable lines when the difference between the test signal response and the baseline signal response exceeds a threshold; and
   (d) issue a countermeasure based upon countermeasure settings; and a switch matrix, the switch matrix configured to inject the test signal into the at least one of the user-selectable lines, break a connection with at least one of the user-selectable lines, extract the test signal response from at least one of the user-selectable lines, and terminate a connection with one of the user-selectable lines when the controller issues a termination command.

2. The apparatus of claim 1 wherein the countermeasure is selected from the group consisting of alerting a user that one of the user-selectable lines is compromised via a text message, alerting a user that one of the user-selectable lines is compromised via an email message, alerting a user that one of the user-selectable lines is compromised via a wireless display device, and issuing a command to terminate a connection with one of the user selectable lines.

* * * * *